(12) United States Patent
Falck et al.

(10) Patent No.: US 9,058,477 B2
(45) Date of Patent: Jun. 16, 2015

(54) PROCESS FOR THE GRADUAL EXCHANGE OF PERSONAL INFORMATION IN NON-TRUSTED PEER-TO-PEER ENVIRONMENTS

(75) Inventors: Thomas Falck, Aachen (DE); Henning Maass, Aachen (DE); Klaus Weidenhaupt, Aachen (DE); Peter Langendörfer, Frankfurt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1804 days.

(21) Appl. No.: 10/575,641

(22) PCT Filed: Oct. 15, 2004

(86) PCT No.: PCT/IB2004/052103
§ 371 (c)(1),
(2), (4) Date: Sep. 20, 2007

(87) PCT Pub. No.: WO2005/039149
PCT Pub. Date: Apr. 28, 2005

(65) Prior Publication Data
US 2008/0003986 A1 Jan. 3, 2008

(30) Foreign Application Priority Data
Oct. 16, 2003 (EP) .................................... 03103836

(51) Int. Cl.
H04W 4/20 (2009.01)
H04W 12/02 (2009.01)
H04L 29/08 (2006.01)
G06F 21/36 (2013.01)
G06F 21/62 (2013.01)
H04W 12/08 (2009.01)
H04W 28/02 (2009.01)

(52) U.S. Cl.
CPC ............ G06F 21/36 (2013.01); G06F 21/6245 (2013.01); H04W 12/02 (2013.01); H04W 12/08 (2013.01); H04W 28/02 (2013.01); H04L 67/104 (2013.01); H04L 67/306 (2013.01); H04L 67/1057 (2013.01); H04L 67/02 (2013.01); H04L 67/108 (2013.01); H04L 69/329 (2013.01)

(58) Field of Classification Search
CPC ........ H04W 4/20; H04W 12/02; H04L 29/08; G06F 21/36; G06F 21/62
USPC ............................. 370/338; 455/566; 345/2.3
See application file for complete search history.

(56) References Cited

U.S. PATENT DOCUMENTS

| | | | | |
|---|---|---|---|---|
| 6,731,316 | B2 * | 5/2004 | Herigstad et al. | 715/864 |
| 7,058,689 | B2 * | 6/2006 | Parker et al. | 709/206 |
| 7,103,313 | B2 * | 9/2006 | Heinonen et al. | 455/41.2 |
| 7,401,098 | B2 * | 7/2008 | Baker | 707/104.1 |
| 7,907,149 | B1 * | 3/2011 | Daum | 345/619 |
| 2002/0103792 | A1 * | 8/2002 | Blank et al. | 707/3 |
| 2002/0184153 | A1 | 12/2002 | De Vries | |
| 2003/0060231 | A1 * | 3/2003 | Bozionek et al. | 455/556 |
| 2003/0191673 | A1 * | 10/2003 | Cohen | 705/5 |
| 2003/0191690 | A1 * | 10/2003 | McIntyre et al. | 705/14 |

(Continued)

Primary Examiner — Steven Kelley

(57) ABSTRACT

The invention relates to a method for the exchange of personal information in non-trusted peer-to-peer environments in a step-by-step fashion, in which the information preferably prepared as a graphics display is segmented into several individual sections and is subsequently alternately exchanged between the communication partners.

7 Claims, 7 Drawing Sheets

(56) References Cited

U.S. PATENT DOCUMENTS

Figure 1:
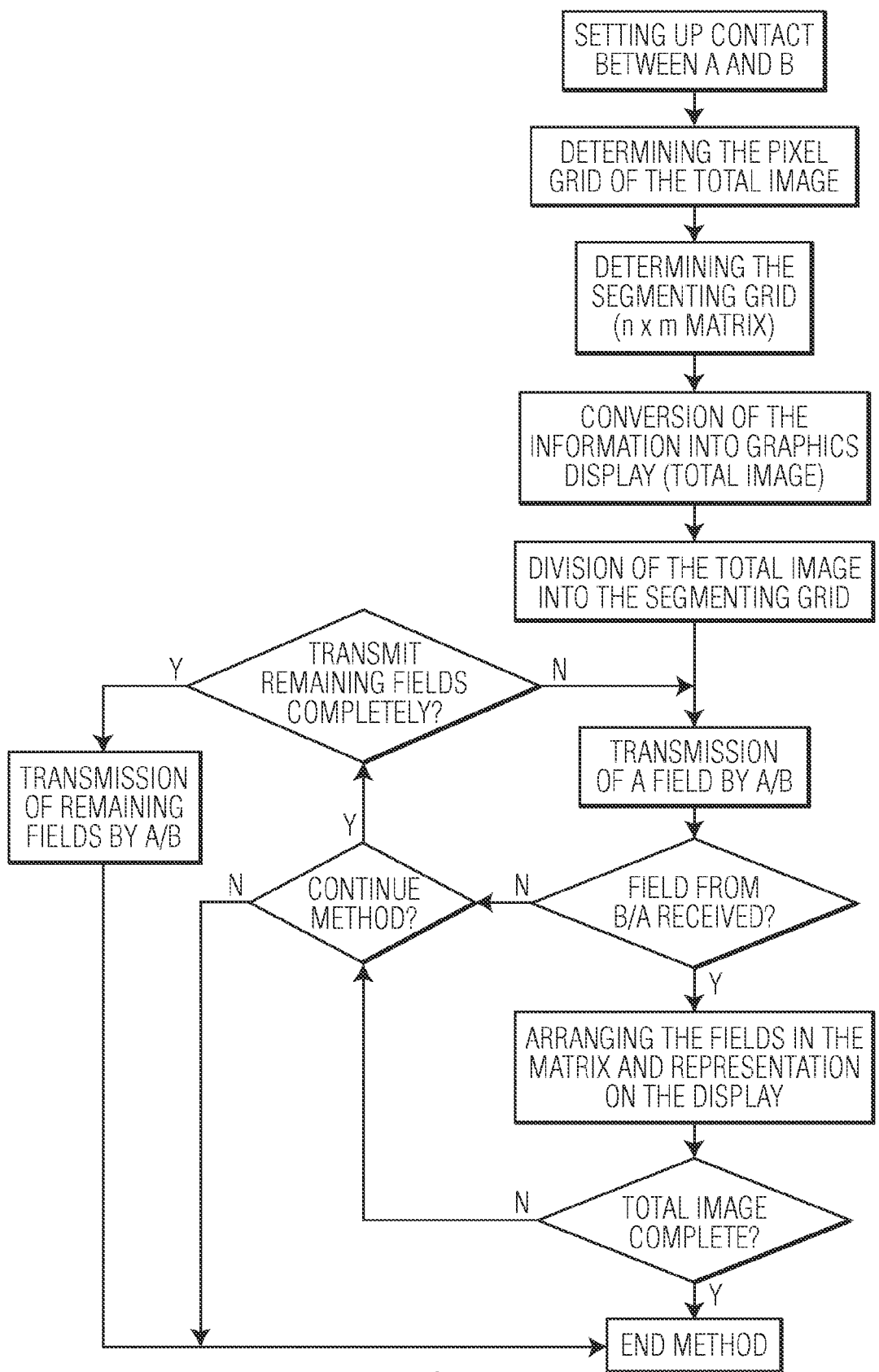

| | | |
|---|---|---|
| 2004/0046656 A1* | 3/2004 | Schaefer et al. ......... 340/539.11 |
| 2004/0093334 A1* | 5/2004 | Scherer ............................ 707/8 |
| 2004/0128148 A1* | 7/2004 | Austin et al. ...................... 705/1 |
| 2004/0203363 A1* | 10/2004 | Carlton et al. ................ 455/41.2 |
| 2004/0218552 A1* | 11/2004 | Polyakov ...................... 370/260 |
| 2005/0021624 A1* | 1/2005 | Herf et al. ...................... 709/204 |
| 2011/0281577 A1* | 11/2011 | Rothschild ................. 455/422.1 |

* cited by examiner

FIG. 3

FIG. 4

STEPS 7 TO 9

FIG. 5

FIG. 6

STEPS 37 TO 39

PETER

```
ME: VERA DOLAR
AGE: 19 YEARS
SEX: FEMALE
HEIGHT: 1,68m
COLOR OF HAIR: BLOND
WEIGHT: 59kg
MARITAL STATUS: SINGLE
PROFESSION: SUL
MUSIC: U2 FAN
SPORT: WINDSURF
```

```
ME: VERA DOLAR
AGE: 19 YEARS
SEX: FEMALE
HEIGHT: 1,68m
COLOR OF HAIR: BLOND
WEIGHT: 59kg
MARITAL STATUS: SINGLE
PROFESSION: SUL
MUSIC: U2 FAN
SPORT: WINDSURF
```

```
ME: VERA DOLAR
AGE: 19 YEARS
SEX: FEMALE
HEIGHT: 1,68m
COLOR OF HAIR: BLOND
WEIGHT: 59kg
MARITAL STATUS: SINGLE
PROFESSION: CONSULT
MUSIC: U2 FAN
SPORT: WINDSURF
```

VERA

```
ME: PETER THALER
AGE: 21 YEARS
SEX: MALE
HEIGHT: 1,85m
COLOR OF HAIR: BLACK
WEIGHT: 82kg
MARITAL STATUS: SINGLE
PROFESSION: P MA
MUSIC: U2 FAN
SPORT: SNOWBOA G
```

```
ME: PETER THALER
AGE: 21 YEARS
SEX: MALE
HEIGHT: 1,85m
COLOR OF HAIR: BLACK
WEIGHT: 82kg
MARITAL STATUS: SINGLE
PROFESSION: P MA
MUSIC: U2 FAN
SPORT: SNOWBOA G
```

```
ME: PETER THALER
AGE: 21 YEARS
SEX: MALE
HEIGHT: 1,85m
COLOR OF HAIR: BLACK
WEIGHT: 82kg
MARITAL STATUS: SINGLE
PROFESSION: CHIP MA
MUSIC: U2 FAN
SPORT: SNOWBOA G
```

|  PETER | VERA |
| --- | --- |

Top row:
- NAME: VERA DOLAR / AGE: 19 YEARS / SEX: FEMALE / HEIGHT: 1,68m / COLOR OF HAIR: BLOND / WEIGHT: 59kg / MARITAL STATUS: SINGLE / PROFESSION: CONSUL▨ / MUSIC: U2 FAN / SPORT: WINDSURF▨
- NAME: PETER THALER / AGE: 21 YEARS / SEX: MALE / HEIGHT: 1,85m / COLOR OF HAIR: BLACK / WEIGHT: 82kg / MARITAL STATUS: SINGLE / PROFESSION: CHIP MA▨ / MUSIC: U2 FAN / SPORT: SNOWBOA▨G Middle row:
- NAME: VERA DOLAR / AGE: 19 YEARS / SEX: FEMALE / HEIGHT: 1,68m / COLOR OF HAIR: BLOND / WEIGHT: 59kg / MARITAL STATUS: SINGLE / PROFESSION: CONSULTANT / MUSIC: U2 FAN / SPORT: WINDSURF▨
- NAME: PETER THALER / AGE: 21 YEARS / SEX: MALE / HEIGHT: 1,85m / COLOR OF HAIR: BLACK / WEIGHT: 82kg / MARITAL STATUS: SINGLE / PROFESSION: CHIP MAN. / MUSIC: U2 FAN / SPORT: SNOWBOA▨G Bottom row:
- NAME: VERA DOLAR / AGE: 19 YEARS / SEX: FEMALE / HEIGHT: 1,68m / COLOR OF HAIR: BLOND / WEIGHT: 59kg / MARITAL STATUS: SINGLE / PROFESSION: CONSULTANT / MUSIC: U2 FAN / SPORT: WINDSURFING
- NAME: PETER THALER / AGE: 21 YEARS / SEX: MALE / HEIGHT: 1,85m / COLOR OF HAIR: BLACK / WEIGHT: 82kg / MARITAL STATUS: SINGLE / PROFESSION: CHIP MAN. / MUSIC: U2 FAN / SPORT: SNOWBOARDING

STEPS 40 TO 42

FIG. 7

PROCESS FOR THE GRADUAL EXCHANGE OF PERSONAL INFORMATION IN NON-TRUSTED PEER-TO-PEER ENVIRONMENTS

In public arrangements or on public places there is an increasing possibility of coming into contact with other persons over radio networks. In particular with so-called peer-to-peer networks, often a mutual identification is necessary. A typical scenario is, for example, the setting up of contact with likeminded persons in an airport lounge. Over mobile devices, like for example PDAs (palmtop computers) or smartphones (internet-enabled handies) it is possible to identify such persons over a short-distance radio link (for example Bluetooth or IEEE 802.11 wireless LAN) and mutually exchange personal information. At present one of the two persons who want to exchange data, must pay in advance and first transmit his personal data to the other person. Since there is still no bond of trust between the persons, this person runs the risk of the other person receiving his data, but on the other hand not revealing her personal data. A possibility of limiting this risk comprises revealing details of the personal profile only step by step. For this purpose the mobile devices often offer the possibility of creating personal user profiles, which can be adapted in their degree of detail with flags depending on the communication partner. The risk of the one-sided revealing of basic information, however, continues to exist.

Here the invention wants to provide a remedy. It is an object of the invention to provide a method for the step-by-step exchange of personal information in non-trusted peer-to-peer environments, which ensures a balanced spreading of risk over the two communication partners. According to the invention, this object is achieved by the fact that the information is divided into several independent sections, which are mutually exchanged step by step between at least two communication partners.

The invention provides a method for the step-by-step exchange of personal information in non-trusted peer-to-peer environments, which ensures a balanced spreading of risks over the two communication partners. With the mutual exchange of independent sections of information it is ensured that these sections merge evenly into one context with the two communication partners.

In a further aspect of the invention the text representation of the information is converted into a graphics display before the segmenting. As a result, system-independent readability of the information is ensured after composition of the individual sections. Furthermore, determining the missing information sections via algorithmic methods is prevented.

In an embodiment of the invention, the segmenting and the exchange of the information take place in such a way that each information unit provides for itself an information contribution recognizable to the user. This makes an evaluation possible of the received section information by the recipient, as a result of which a balanced information exchange is promoted.

Preferably, the graphics display of the information is divided into n rows and m columns, from which a matrix of n×m fields results. This enables the combining of the graphic individual sections to a puzzle.

Advantageously, the grid of the matrix is agreed upon between the communication partners before the segmenting of the information. As a result it is ensured that the information segmenting takes place homogeneously on both pages, so that the exchange process is harmonized. Furthermore, the visualization of the information combined step by step is facilitated.

Preferably the grid of the matrix is standardized. As a result of this, a previous agreement on the grid is unnecessary, so that information exchange is accelerated.

In a further aspect of the invention, each information fragment has its position in the matrix attached to it. As a result of this, the composition of the total information is simplified.

In an embodiment of the invention, either partner can abort information exchange at any time. As a result, each partner is allowed to terminate the transmitting of his personal information, for example in case of strongly differing information content of the merging information fragments.

In a further embodiment of the invention the information sections not yet transmitted can be transmitted in one step at any time. This enables the acceleration of the information exchange at any time.

Figure 2:
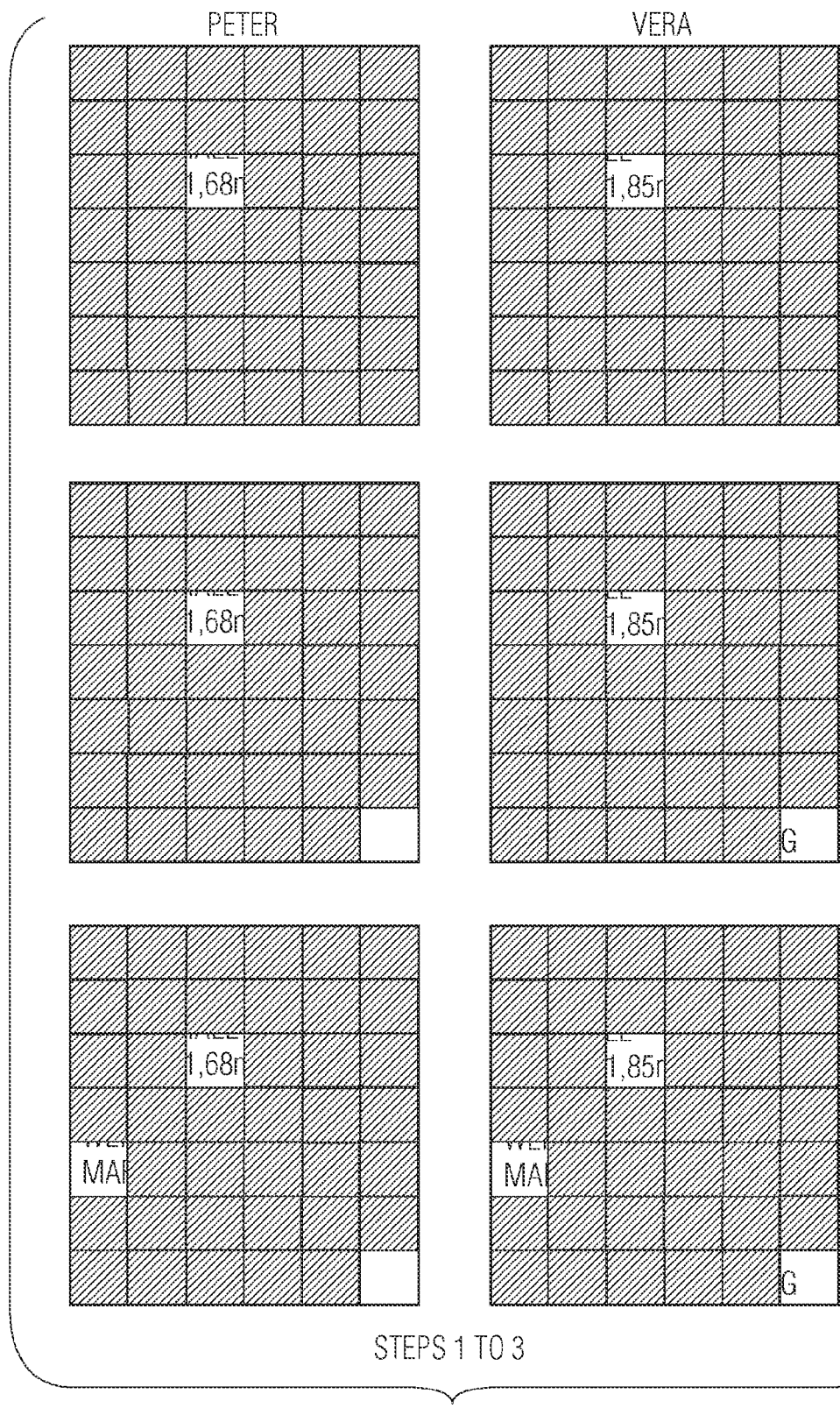

Other further embodiments and designs of the invention are indicated in the remaining dependent claims. An example of embodiment of the invention is represented in the drawings and is described in detail hereinafter. It shows in:

FIG. 1 the flow chart of the method according to invention;
FIG. 2 steps 1 to 3 the merging of information divided into 42 sections;
FIG. 3 steps 4 to 6 of the information merging from FIG. 2;
FIG. 4 steps 7 to 9 of the information merging from FIG. 2;
FIG. 5 steps 22 to 24 of the information merging from FIG. 2;
FIG. 6 steps 37 to 39 of the information merging from FIG. 2 and
FIG. 7 steps 40 to 42 of the information merging from FIG. 2

In the example of application in accordance with FIG. 1, A and B agree to mutually exchange personal information. Firstly A conveys to B, what size (pixel width/height) the total picture should have, which is to be supplied by B to A. B does this in analogous fashion. Following the definition of the pixel grid of the total picture, A and B agree on the number of rows (n) and columns (m), into which the respective picture is to be divided. On the basis of this defined data now the conversion of the respective information into a graphics display takes place with A and B. If the data is present for example in XML, then by means of XSL Style sheets an HTML document can be generated, which can be displayed by means of a web browser. The generated graphics display is subsequently divided into n rows and m columns, so that a matrix with n×m fields results. Thus n×m fields are clearly defined. The fields can be saved in a usual image format (JPEG, GIF or similar). A now happens to select a field and sends it with the specification of the appropriate line and column number to B. B receives the field, arranges it at the right position in the matrix and displays it on the display. Now B sends the field to A, which is at the same position as the field just received from A. A receives this field, arranges it at the right position in the matrix and displays it on the display. Now according to this pattern the exchange of the remaining fields takes place in analogous fashion. For A and B there is always the option of terminating the method prematurely and thus of aborting the information exchange. If one user has the impression that he can trust the other, then at any point of time in the exchange process he can offer to exchange the remainder of the image in one step in order to accelerate the process. If the other person consents, both transmit the still remaining fields in one step to the respective other person.

In the example of application in accordance with FIGS. 2 to 7 the method is clarified by way of example from the point of view of two users Peter and Vera. The image generated from the personal information has a resolution of 300×300 pixels and was divided into 7×6 fields. Therefore, 42 fields are to be transmitted altogether, till the respective other user can see the image completely. Whereas the two users still cannot infer any coherent information (compare FIG. 4) after the exchange of 9 fields of the display, after the exchange of 24 images already section information such as size or hair color can be guessed (compare FIG. 5). After 37 fields (compare FIG. 6) already substantial information is exchanged, here for example the transmission of the remaining fields for the acceleration of the exchange process would be conceivable. If all 42 fields were exchanged, the users Peter and Vera in this case have the complete personal information of their counterparts (compare FIG. 7). The structuring of the information in this example of application is selected arbitrarily; naturally any other structure is possible. In the same way, personal images or technical drawings etcetera can also be exchanged. The method is applicable without modification for any data formats, in which the information to be exchanged is available. The recipient need not worry about how the data is to be presented to the user, since the sender already supplies images, which only need to be reproduced. The user detects quickly whether the supplied information is of interest to him. (With raw data this is substantially more difficult for him to find out, if necessary he has to wait till the data is transmitted completely.) As a result, aborting the information exchange at an early point of time is possible, so that it is ensured that the user does not reveal personal data without a service in return. The user can stop the exchange process at any time. Furthermore, the use of the graphics format protects against machine analysis and subsequent processing of the personal data by a third party.

The invention claimed is:

1. A method of sharing risk of exchange of personal information between at least two wireless communication devices in a non-trusted peer-to-peer environment, the method comprising acts of:
communicating between the two wireless communication devices to allow a first and second user to agree on a number of rows and columns to segment a display, wherein the number of rows and columns are both greater than one;
on each of the at least two wireless communication devices
converting a text representation of the personal information into a graphics display;
segmenting the graphics display of the personal information into the agreed upon number of rows and columns; and
reciprocatingly exchanging corresponding segments of the graphics display one segment at a time between the wireless communication devices, wherein the reciprocally exchanging further comprises acts of
receiving a selection on a first device of a single segment of first personal information to transmit from the first device to the second device,
receiving the single segment with its identified row and column information at the second device,
extracting the row and column information of the received segment on the second device,
selecting by the second device a segment of second personal information identified by the extracted row and column information, and
transmitting from the second device to the first device the selected segment of second personal information,
wherein the first user is able to select and transmit a second single segment of first personal information from the first device only after receiving the selected segment of second personal information from the second device.

2. The method as claimed in claim 1, wherein each of the segments provides recognizable information.

3. The method as claimed in claim 1, wherein the numbers of rows and columns differ.

4. The method as claimed in claim 1, wherein a size of the graphics display and the numbers of rows and columns are predetermined before segmenting.

5. The method as claimed in claim 3, wherein a size of the graphics display is standardized.

6. The method as claimed in claim 3, wherein each segment of the segments comprises an identification of its corresponding position in the graphics display.

7. The method as claimed in claim 1, further comprising acts of:
prior to exchanging all of the segments
receiving a request for termination of the exchanging, and in response terminating the exchanging.

* * * * *